US005672106A

United States Patent [19]

Orford et al.

[11] Patent Number: 5,672,106

[45] Date of Patent: Sep. 30, 1997

[54] COMBINED TOTALIZER AND FIXED ODDS BETTING SYSTEM AND METHOD

[75] Inventors: John Flindt Orford, Allawah; Bernard Allen Wilkinson, Coogee, both of Australia

[73] Assignee: Totalizator Agency Board, Australia

[21] Appl. No.: 526,972

[22] Filed: Sep. 12, 1995

[30] Foreign Application Priority Data

Sep. 13, 1994 [AU] Australia ............................. PM8110

[51] Int. Cl.$^{6}$ ............................................. G06F 17/00

[52] U.S. Cl. ............................. 463/28; 463/42; 364/412

[58] Field of Search ............................. 273/138.1, 138.2; 463/28, 42; 364/412

[56] References Cited

U.S. PATENT DOCUMENTS 4,775,937 10/1988 Bell ......................................... 463/28

FOREIGN PATENT DOCUMENTS 590777 of 0000 Australia .

2 180 675 4/1987 United Kingdom .

*Primary Examiner*—Benjamin H. Layno

*Attorney, Agent, or Firm*—Fishman, Dionne, Cantor & Colburn

[57] ABSTRACT

The present invention discloses a combined totalizator and fixed odds betting system able to be operated both on and off-course via a central computer (C) connected with communication links (L) to a large number of betting terminals (T). Both totalizator wagering and fixed odds betting are conducted with a common pool. During the lead up to the race the fixed odds dividend to be paid is adjusted for each runner in stages in accordance with the potential liabilities arising at each stage from the bets to date as the pool increases in size towards race starting time.

23 Claims, 1 Drawing Sheet

COMBINED TOTALIZER AND FIXED ODDS BETTING SYSTEM AND METHOD

The present invention relates to win totalizators and, in particular, to a combined win totalizator and fixed odds betting system implemented on a distributed computing system.

BACKGROUND OF THE INVENTION

The concept of the totalizator was developed in the early years of the twentieth century as a means of ensuring consistent earnings to a government or race club which operates a legalized betting system. In recent years the totalizator systems have become very substantial business concerns with many "betting shops" each having one or more computer terminals which are connected to a central processor or central computer. Where the totalizator is operated at a single racecourse, the central processor can be the central processor unit of a relatively small computer having only a relatively small number of terminals at which only racegoers to that particular meeting place their bets. Alternatively, the totalizator can operate over a single jurisdiction such as a state, in which case there can be over a thousand betting shops and many thousands of terminals.

The basic principle of a totalizator is to pool the monies wagered by all punters, deduct a commission from this pool, and pay a dividend to those winners which is calculated from the balance of the pool divided by the number of winning units. In this connection a winner is paid in accordance with the number of units (usually $1) which the winner has purchased in the totalizator or tote. Because the commission is taken from the pool prior to dividing the pool amongst the winners, the tote operator is guaranteed a return which is directly linked to the volume of money, or turnover, wagered on each race.

The totalizator system has been outstandingly successful in reducing the incidence of illegal betting, particularly by unlicensed off-course bookmakers. In addition, the revenue generated by the commission withdrawn from the pool of money wagered on each race, has also been able to be used to improve the standard of racing facilities, and the like.

Because of the large number of betting shops distributed over, say, a state, it is not uncommon for a major race in the state of New South Wales that the total totalizator win pool to be of the order of $500,000, of which only of the order of $50,000 has actually been wagered on course at the totalizator facilities at the racecourse. Because of the computerisation of the totalizator, it is possible for a totalizator to remain open not only up to advertised race start time (ARST) but also beyond this time until the racers (be they horses, trotters, or greyhounds) actually start. It is well known that the volume of money invested into the totalizator pool grows with time and can increase substantially in the last minutes before a race. Thus a typical Saturday afternoon race, for example, will see the totalizator open on the Friday and small amounts of money will be invested on that day and early on the Saturday morning. However, during the afternoon increasing amounts of money are wagered in an increasing crescendo which culminates with the closing of the totalizator. One of the reasons for this is that the totalizator is used by on-course bookmakers to lay off large bets they may have taken on particular runners in a race and/or to better balance their risk on a particular race. In addition, arbitrage punters will place bets both with on-course bookmakers and the totalizator if the likely returns on the two systems available are perceived to be potentially rewarding. A large percentage of off-course punters also wait until late approximate win dividend updates are available before placing their wagers.

During the course of the totalizator being open, the likely return (or dividend) to be paid in the event of a particular runner winning the race, is displayed for each runner. As the favourable sentiment of various runners waxes and wanes, and relatively more or relatively less money is backed on particular runners, so the approximate or likely dividend for the various runners changes. This changing forecast tote dividend is displayed in the lead up to the race and is information which is eagerly sought after by punters.

Despite its many advantages, the totalizator system suffers from several disadvantages. One such disadvantage is that professional punters are, in practical terms, obliged to limit the volume of their wagers since a very large bet would effectively "swamp" the return for the particular horse. This would very substantially reduce the pay out, even if the punter were certain of the outcome. Furthermore, many persons prefer as either a cultural or habitual idiosyncrasy to place bets at fixed odds. This is the traditional betting system offered by bookmakers and has the advantage for the punter that the return, in the event of a win, is fixed.

In addition, many punters wish to derive enjoyment from being able to place a bet on a horse at high odds and have the satisfaction of seeing the odds for their selection reduce in the lead up to the race because of "the pressure of money". The satisfaction gained is that of knowing that their acumen was "ahead of the pack". For these reasons and other reasons illegal starting price off-course bookmakers who operate by telephone have not been completely eliminated, notwithstanding the overall commercial and social success of totalizator systems.

SUMMARY OF THE INVENTION

It is the object of the present invention to substantially overcome or ameliorate the above mentioned disadvantages by the provision of a fixed odds betting system for punting on the outcome of a race, which system can be expected to be operated by a totalizator agency board, or like legalised entity, so as to return a modest, but consistent, profit to the operating authority. In brief, this object is achieved by simultaneously operating both totalizator wagering and fixed odd betting within the one system utilising a common pool, and during the lead up to the race adjusting the dividend to be paid on the fixed odds betting for each runner in accordance with the potential liabilities arising from the bets to date as the pool increases in size towards race starting time.

In accordance with a first aspect of the present invention there is disclosed a combined win totalizator and fixed odds betting system for punting on the outcome of a race between a multiplicity of runners, said system comprising a plurality of betting terminals each linked to a central processor means and each able to input either a tote wager or a fixed odds bet, wherein:

1. from initial commencement of punting said central processor means disables said terminals in respect of fixed odds betting to thereby enable only totalizator wagering,
2. after attainment of a first predetermined target, said central processor means deducts from the then total pool of funds wagered, a predetermined commission to arrive at a then net distribution totalizator pool,
3. for each runner in the race said central processor means divides the net totalizator distribution pool by the amount in the net distribution totalizator pool wagered on that runner winning in order to arrive at a then projected totalizator dividend for each runner, 4. the dividend for each runner calculated in step 3 above is used by said central processor means to constitute an initial fixed odds betting dividend for each runner,
5. said terminals are enabled by said central processor means to accept fixed odds betting simultaneously with said totalizator wagering whilst maintaining two separate wager and bet dividend liability pools
6. after a further calculatable target has been reached, if necessary said central processor means recalculates the fixed odds betting dividend by
   (a) from the total of the wager and bet pools deducting said predetermined commission to arrive at a total nett pool
   (b) for each runner deducting from the total nett pool the liability due to the total number of fixed odds bets received to date for that runner to arrive at a nett totalizator pool for that runner,
   (c) from the nett totalizator pool for each runner calculating a revised estimated totalizator dividend, and
   (d) adjusting the fixed odds betting dividend offered thereafter for each runner to be substantially equal to said revised estimated totalizator dividend for that runner,
7. said central processor means repeats step 6, if necessary, following each attainment of further calculatable targets, and
8. said terminals are disabled by said central processor unit in respect of fixed odds betting prior to the disablement of said terminals in respect of totalizator wagering.

In accordance with another aspect of the present invention there is disclosed a method of operating a combined win totalizator and fixed odds betting system for punting on the outcome of a race between a multiplicity of runners, said system comprising the steps of:

1. from initial commencement of punting accepting only totalizator wagering,
2. after attainment of a first predetermined target, deducting from the then total pool of funds wagered a predetermined commission to arrive at a then net distribution totalizator pool,
3. for each runner in the race dividing the net totalizator distribution pool by the amount in the net distribution totalizator pool wagered on that runner winning in order to arrive at a then projected totalizator dividend for each runner,
4. using the dividend for each runner calculated in step 3 above to constitute an initial fixed odds betting dividend for each runner,
5. accepting fixed odds betting simultaneously with said totalizator wagering and maintaining two separate wager and bet dividend liability pools
6. after a further calculatable target has been reached, if necessary recalculating the fixed odds betting dividend by
   (a) from the total of the wager and bet pools deducting said predetermined commission to arrive at a total nett pool
   (b) for each runner deducting from the total nett pool the liability due to the total number of fixed odds bets received to date for that runner to arrive at a nett totalizator pool for that runner,
   (c) from the nett totalizator pool for each runner calculating a revised estimated totalizator dividend, and
   (d) adjusting the fixed odds betting dividend offered thereafter for each runner to be said revised estimated totalizator dividend for that runner,
7. repeating step 6, if necessary, following each attainment of further calculatable targets, and
8. ceasing fixed odds betting prior to ceasing totalizator wagering.

A preferred embodiment of the present invention will now be described with reference to the drawing and to the Tables appearing at the rear of the specification in which:

DETAILED DESCRIPTION OF THE PREFERRED EMBODIMENT

Figure 1:
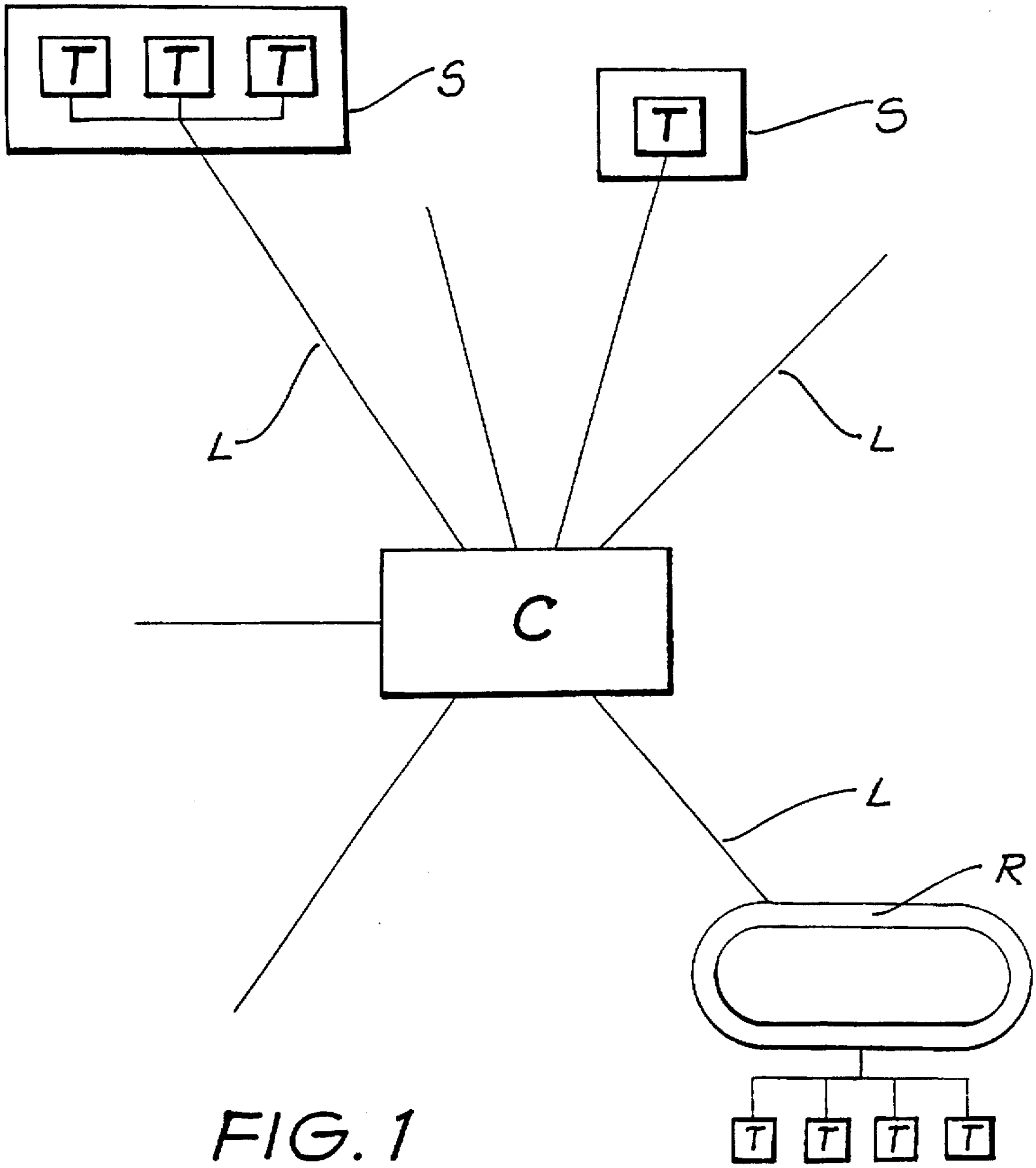
FIG. 1 is a schematic diagram illustrating the computer system operated by the Totalizator Agency Board.

Table I illustrates the calculation of the tote win pool based on the initial investment, Table II illustrates the calculation of the fixed odds betting (FOB) dividend based on the initial tote investment, Table III illustrates the calculation of the updated combined pool, Table IV illustrates the calculation of the revised or updated FOB dividend, Table V shows the calculation of the revised FOB dividend for Runner 7 in Table IV, Table VI shows a calculation to determine a maximum available bet on Runner 7 utilising data in Tables IV and V, and Table VII shows for a simulated race using actual totalizator data, a comparison between the preferred embodiment of the present invention and a prior art system.

As seen in FIG. 1, the computer system operated by the Totalizator Agency Board (TAB) consists of a central computer C which is linked by land lines, telephone lines or like communication links L to betting terminals T which can be located at either widely geographically dispersed betting shops S or at a race track R.

In the described example it is assumed that the total amount punted or invested by punters on a win pool will be in the vicinity of $500,000. As punters can make investments either on the win totalizator, or on fixed odds betting, or both, the term "wager" will be used in respect of monies invested in the win totalizator and the term "bet" will be used in respect of monies invested in the fixed odds betting (FOB).

The first step in the operation of the system is to open a substantially conventional win totalizator system many hours before the commencement of a particular race and, during an initial period following the commencement of the tote, to not accept any fixed odds bets. During this period, the monies wagered by punters can be used to form an actual market guide which is then used to frame the fixed odds to be offered. This situation of accepting only tote wagers, and not accepting fixed odds bets is continued until a predetermined target is reached. In the described preferred embodiment this predetermined target is a tote investment pool of $100,000 representing 20% of the estimated final pool. It is not essential that this be the way of determining the predetermined target. In other embodiments the predetermined target can be either a monetary target and/or a time target (i.e. that the initial "tote investments only" period had been in operation for a sufficient length of time).

To continue with the preferred embodiment, once the initial tote investment of $100,000 has been reached (being 20% of the expected total overall investment) the position reached is as indicated in Tables I and II. In Table I the initial tote investment of $100,00 is indicated. From this is deducted the commission (14.25%) representing $14,250 which is used to fund the totalizator agency. This leaves an available initial tote pool of $85,750.

In Table II, the first column indicates the number allocated to each of the eight runners in the race. The second column indicates the distribution of the initial tote investment amongst the various runners. This investment will be an indication from the punting public of their view of the likely chances of success of various runners. That is to say, Runner 1 has the most money wagered on its behalf and therefore should expect to to be the "favourite" while Runner 7 has the least money wagered on its behalf and should therefore be the "outsider".

If the $85,750 pool is divided by the investment for each runner then an approximate tote dividend per $1 investment can be calculated. This is indicated in the third column of Table II so that $85,750/$25,000 equals 3.43; $85,750/$5,000 equals 17.15, and so on.

The numbers in the third column of Table II are now rounded downwardly to the nearest integral number of ten cents so that 3.43 for Runner 1 becomes 3.40. This figure is then declared to be two things. Firstly, at this stage in the operation of the tote, the figure is the estimated tote dividend for each of the runners based upon the monies wagered to date.

In addition, in accordance with the preferred embodiment, the numbers in the fourth column of Table II also constitute the opening fixed odds betting dividend and therefore determine the pay out or dividend to be made on the basis of fixed odds betting which commences at the completion of the calculation which gives rise to Table II.

In this connection it should be understood that for Runner 1, for example, the odds are actually 2.4 to 1 since the dividend of $3.40 indicates both the return of the initial bet and the money paid in accordance with the odds.

Once the position as outlined in Table II has been reached, the central computer C in FIG. 1 sends a signal to each of the terminals T which overcomes the previously disabling signal which prevented the terminals T from accepting fixed odds bets. That is, the terminals T are enabled. From now on, the FOB dividends are displayed and the terminals T are able to accept fixed odds bets. This situation is allowed to continue until a calculatable target has been reached which, in the preferred embodiment, is the investment by punters of a further $20,000 into the total system.

This gives rise to the situation as indicated in Table III where, for the purposes of this embodiment, it is assumed that in addition to the initial tote investment a further $10,000 has been wagered on the tote and $10,000 has been bet on the FOB. This gives rise to a total pool of $120,000. From this investment is deducted the 14.25% commission (i.e. $17,100) which gives an updated total pool available for distribution of $102,900.

At this stage in order to limit the liability of the operator of the system, the FOB dividend (or odds) should be revised. This revision is explained in relation to Table IV.

The first two columns of Table IV reproduce the first two columns of Table II. The third column of Table IV shows the breakdown of the further tote investment of $10,000 amongst the eight runners. The fourth column of Table IV reproduces the fourth column of Table II.

The fifth column of Table IV illustrates the breakdown amongst the various runners of the FOB investment which totals $10,000. It will be seen, in particular, that the same amount has been bet on both runners 6 and 7, notwithstanding that the initial FOB dividend for these two runners is markedly different.

The sixth column in Table IV illustrates the FOB liability in the event that the winner of the race should be each of the various runners. Thus since $3,000 has been bet on Runner 1 winning the race at an initial FOB dividend of $3.40, the liability in the event that Runner 1 wins is $\$3.40\times3000=\$10,200$. Similarly, the liability in the event that Runner 2 should win is $\$17.10\times1000=\$17,100$.

Column 7 in Table IV illustrates the total tote investment which is simply the total of columns two and three in Table IV.

The eighth column in Table IV is the revised FOB dividend and the calculation of the entries in this column will be explained in relation to Table V.

The calculation explained in Table V is carried out for each of the eight as runners of Table IV, however, it is illustrated in detail only for Runner 7. As indicated from Table II, the updated total pool at the time of this revision of the FOB dividend is $102,900. In the event that Runner 7 should win, then from column six of Table IV the liability for the winning FOB bets is $28,500. The pay out of this mount would leave available for distribution to those persons who had wagered on the tote, an so amount of $74,400. From column seven of Table IV the total number of winning tote units for Runner 7 is 4000. As a consequence, the estimated tote dividend in the event that Runner 7 should win is $74,400/4,000=$18.60.

If the calculation outlined in Table V for Runner 7 is carried out for each of the other runners indicated in Table IV, then the numbers indicated in column eight of as Table IV are able to be calculated. For example, for Runner 5, the updated total pool is $102,900 from which is subtracted the FOB liability ($7,100) in the event that Runner 5 wins, which gives a total of $95,800 available for distribution to the tote winners. Since the total tote investment is $13,000 or 13,000 units, the resulting calculation is $95,800/13,000=$7.37 and thus the FOB dividend for Runner 5 is increased from $7.10 to $7.30 ($7.37 again in this embodiment being rounded down to the nearest integral number of ten cents).

This estimated tote dividend is now adopted as the revised FOB dividend in order to bring about two results. The first result is to reflect the fact that the monies bet on FOB as indicated in column five of Table IV are not in the same proportion as the total tote investment wagered as indicated in column seven. This imbalance requires a change in the odds. Furthermore, the odds must be changed in such a way as to ensure that, irrespective of the outcome, the totalizator operating authority does not make a loss. The above described arrangement ensures that this desirable situation is retained.

The above described revision of the FOB dividend is preferably carried out in a series of cycles during the course of the punting leading up to starting time. Naturally, in calculating this revision it is necessary to calculate the total FOB liability on each runner to date. Thus it is necessary to know the total value of bets on each FOB dividend "offered" at the end of each revision cycle.

A revision cycle can be triggered by any one, or if desired, any one or more of, a number of factors. Preferably, these factors can include the total amount invested by punters, the total liability of the FOB betting, the value of FOB bets, the number of FOB bets, the time since FOB betting commenced or changes in excess of a predetermined magnitude between the estimated return as a result of totalizator wagers as compared to the guaranteed return for FOB betting (that is if the FOB odds and the totalizator "odds" become different by more than a predetermined amount).

As a consequence of the above, during the course of the betting the FOB dividend changes over time in approximately the same way that the estimated return from totalizator wagering also changes over time. This amounts to "normal betting fluctuations" which occur as a matter of routine in the lead up to a race.

In order to protect the totalizator and fixed odds betting authority from loss, it is desirable to limit the maximum amount which can be bet by any one punter. This also has the advantage of ensuring that if a number of punters wish to bet at the same time, then a number of punters are able to at least place some money on their fancied runner at the desired odds. One way of limiting the size of the maximum available bet is indicated in Table VI and utilises the principle that the maximum available bet should constitute some specified fraction, for example one half, of the maximum amount of as money then available at the time the bet is placed.

Table VI is understood to be a calculation carried out at the same time as the calculation in Table V is carried out. Thus, for this example, the calculation is carried out at the time the updated total pool available is $102,900. Again the calculation is carried out for Runner 7, in which case the FOB liability of $28,500 is subtracted to give a maximum pay out available of $74,400. This mount of money is the mount which could be paid to a single person betting a large sum of money without incurring any loss by the totalizator operating authority.

If, as a matter of prudence, half of that maximum pay out is deemed to be the factor which governs the maximum bet, then the pay out made to the maximum bet would be $74,400/2=$37,200.

Since at this time the FOB dividend currently on offer for Runner 7 is $18.60, if the maximum pay out is divided by this dividend this indicates a bet of $2000 can be accepted at a dividend of 18.60 in order to limit the maximum pay out to $37,200.

If this bet should be placed, the pool is slightly increased, however, the FOB liability has been substantially increased, and thus application of the same rule indicates that the next maximum bet allowable would be in the vicinity of half that previously acceptable, i.e. approximately $1,000. This procedure can be applied repeatedly in order to both limit the liability of the totalizator operating authority and also to make it less likely that a particular punter can place all the available bets on a particular runner at a particular offered odds.

The above described procedures am continued in the lead up to the race, however, in accordance with the preferred embodiment, a disabling signal is sent by the central computer C to each of the terminals T in FIG. 1 at a predetermined time (e.g. 1 minute) before advertised race starting time. This therefore closes off the fixed odds betting. However, tote wagering is permitted to continue up and until jump time or actual start time. This allows arbitrage punters time to invest so that the dividend on totalizator wagering becomes very close to the bookmaker's Starting Prices as is presently the case. This has the practical result of making the totalizator pool the "last" fixed odds bet practically available on every runner and thus the totalizator FOB dividend effectively equates to the "Starting Price dividend" for each selection.

In some jurisdictions there may be concern that traditional totalizator wagers investors would subsidise those bettors who take advantage of 'overs' from Fixed Odds. Essentially this concern arises because those wagering into the totalizator might pay 'more tax' than those who opted to take advantage of fixed odds.

In effect this possibility is a price that has to be borne in order to introduce Fixed Odds whilst still guaranteeing a set rate of commission to the operating authority. In order to minimise this tax anomaly an enhancement to the above described embodiment has been developed.

The enhancement involves rounding down the price which is offered to bettors before displaying the Fixed Odds price. The following roundings' scale across the range of dividends has now been introduced into the model:

| CALCULATED FOB PRICE | FOB PRICE ROUNDED DOWN TO: | EXAMPLE |
|---|---|---|
| 1.00–2.99 | lower 0.10¢ | 2.16 rounded down to 2.10 |
| 3.00–4.99 | lower 0.20¢ | 3.34 rounded down to 3.20 |
| 5.00–9.99 | lower 0.50¢ | 5.47 rounded down to 5.00 |
| 10.00–19.99 | lower $1.00 | 12.75 rounded down to 12.00 |
| 20.00–49.99 | lower $5.00 | 27.43 rounded down to 25.00 |
| 50.00–99.99 | lower $10.00 | 74.89 rounded down to 70.00 |
| 100.00 and above | lower $50.00 | 154.36 rounded down to 150.00 |

Essentially the enhancement provides the following:

Fixed Odds bettors pay a greater rounding premium on their bets in comparison to those making totalizator wagers.

The greater rounding premium imposed on Fixed Odds bettors reduces any "subsidising" effect of those making totalizator waters. This is because some may argue that in the event of the fixed odds dividend falling in the course of operation of the pool, those fixed odds bettors who placed their bet at a high fixed odd dividend relative to the final totalizator dividend are being subsidized to some extent by all those making totalizator wagers. In effect, the rounding down of Fixed Odds dividend is to the benefit of the totalizator pool.

The rounded down Fixed Odd dividends are easily accepted by bettors as they are similar to those rounded down odds offered by traditional bookmakers.

The need to refresh dividends (i.e. re-calculated the fixed odds and tote dividends is less frequent).

Novelty searches located after the priority date have disclosed Australian Patent No. 590 777 (previously Application No. 60112/86) granted to ATL Pty Limited. This patent discloses a combined totalisator and fixed odds betting system which has not found commercial acceptance and the patent has not been renewed. The basis of this prior art system differs from that of the present invention in a number of important aspects.

Firstly, in the calculation of the tote dividend and the freed price for each contestant, only a fraction of the tote pool is used. This fraction is said to preferably be as 50% (i.e. 0.50) and to lie with the range between 1% and 99%. This fraction is termed the "proportion" parameter. There is no equivalent to this parameter in the present invention as the entire tote pool is used in such calculation instead.

Secondly, in order to limit the liabilities arising from receipt of fixed odds wagers, the prior art system uses a "responsiveness factor" which is preferably 4% to exaggerate the liabilities incurred in response to bets made at "high prices". Again there is no equivalent in the present invention.

Thirdly, in the prior art system it is essential to recalculate the fixed odds prices being offered each time a fixed odds bet is made. This is not the case with the present invention and the substantial computational load imposed by this requirement of the prior art is thereby avoided by the present invention.

Fourthly, in calculating the tote dividend for a particular runner, the prior art system divides by the sum of two amounts—namely the total of the fixed price bets for the runner, and the product of the proportion parameter and the total of the tote wagers for the runner. This is to be contrasted with the present invention in which the division is by the total of the tote wagers for the runner.

Fifthly, in calculating the "fixed price" (or fixed odds betting dividend), the prior art system utilizes a "maximum allowed fixed price wager" which is another system parameter which is preferably set to 1% of the total of the tote wagers to date. Again, there is no such system parameter in the present invention.

In view of the foregoing, it is clear that there are substantial differences between the prior an system and the present invention. A computer simulation has been carried out by the applicant using actual data from a totalizator pool operated for a Sydney race meeting but using the assumption that after the initial commencement all monies actually received by the pool were to be allocated 50:50 between tote wagers and FOB bets. This simulation was further carried out for the preferred embodiment described in the ATL Pty Limited patent again using the same data and the same assumptions.

The results are shown in Table VII, and set out the total of the combined pool at each of 11 sequential times. The first is 9 minutes before advertised race start time (ARST), the next 8 before ARST, and so on until ARST is reached, and finally the time "CLOSE" being the time shortly before the actual delayed commencement of the race at which time the tote actually closed.

It is clear from Table VII that the "FO" (or fixed odds betting dividend) closely tracks the "TOTE" or totalizator wagering dividend for the present invention (TAB). However, for the prior art system there is a large discrepancy.

In the particular race, for runners no. 2 both the tote and fixed odds dividend for that runner consistently are reduced (i.e. "shorten") as the money is deposited into the pool. The reverse applies for, say, runner no. 7 whose dividends grow as an increasingly smaller proportion of the total monies deposited into the pool wish to wager or bet on runner no. 7.

It will be seen that for the preferred embodiment (TAB) the dividends for runner no. 1 decrease and those for runner no. 7 increase over time towards the close. Further there is always a close similarity between the TOTE dividend and the fixed odds dividend. However, for the prior art system (ATL) there is a markedly lower dividend for fixed odds bets than for totalizator wagers, except for the "lowest priced runners" where this position is actually reversed. Further, the flow of money in favour of the "lowest priced runners" does not in the (ATL) system increase the dividends as should be the case for the other runners, for example for runner no. 7, as much as the increase in the present invention (TAB). Thus in the ATL system horses which are not backed during the course of the pool do not "blow-out" in the betting.

The foregoing describes in detail only some examples of the present invention and modifications, obvious to those skilled in the art, can be made thereto without departing from the scope of the present invention.

For example, although the preferred embodiment has been described in relation to horse racing, the "runners" need not be horses since the present invention is equally applicable to greyhounds, harness racing and other sporting competitions or events where the running of the competition or even provides a winner and thus the various competitors or participants constitute "runners".

TABLE I

| | $ |
|---|---|
| Initial Tote Investment | 100,000 |
| Less 14.25% Commission | 14,250 |
| Available Initial Tote Pool | 85,750 |

TABLE II

| (1) Runner | (2) Initial Tote Investment | (3) Approximate Tote Dividend per $1.00 Investment | (4) Down Rounded Tote Dividend and FOB Dividend |
|---|---|---|---|
| 1 | 25,000 | 3.43 | 3.40 |
| 2 | 5,000 | 17.15 | 17.10 |
| 3 | 18,000 | 4.76 | 4.70 |
| 4 | 9,000 | 9.53 | 9.50 |
| 5 | 12,000 | 7.15 | 7.10 |
| 6 | 20,000 | 4.29 | 4.20 |
| 7 | 3,000 | 28.58 | 28.50 |
| 8 | 8,000 | 10.72 | 10.70 |
| | 100,000 (85,750 Pool) | 85.61 | 85.20 |

TABLE III

| First Update Total Investment | |
|---|---|
| Initial Tote | 100,000 |
| Further Tote | 10,000 |
| FOB | 10,000 |
| | 120,000 |
| Less 14.25% Commission | 17,100 |
| Updated Total Pool | 102,900 |

TABLE IV

| (1) Runner | (2) Initial Tote Investment | (3) Further Tote Investment | (4) Initial FOB Dividend | (5) FOB Investment | (6) FOB Liability | (7) Total Tote Investment | (8) Revised FOB Dividend |
|---|---|---|---|---|---|---|---|
| 1 | 25,000 | 2,000 | 3.40 | 3,000 | 10,200 | 27,000 | 3.40 |
| 2 | 5,000 | 2,000 | 17.10 | 1,000 | 17,100 | 7,000 | 12.20 |
| 3 | 18,000 | 1,000 | 4.70 | 1,000 | 4,700 | 19,000 | 5.10 |
| 4 | 9,000 | 1,000 | 9.50 | 1,000 | 9,500 | 10,000 | 9.30 |
| 5 | 12,000 | 1,000 | 7.10 | 1,000 | 7,100 | 13,000 | 7.30 |
| 6 | 20,000 | 1,000 | 4.20 | 1,000 | 4,200 | 21,000 | 4.70 |
| 7 | 3,000 | 1,000 | 28.50 | 1,000 | 28,500 | 4,000 | 18.60 |
| 8 | 8,000 | 1,000 | 10.70 | 1,000 | 10,700 | 9,000 | 10.20 |
| | 100,000<br>(85,750) | 10,000 | | 10,000 | | 110,000 | |

TABLE V

Runner 7 Inital FOB Dividend Update

| | $ |
|---|---|
| Updated Total Pool | 102,900 |
| Less FOB Liability (For Runner 7) | 28,500 |
| Runner 7 Tote Pool | 74,400 |
| Total Tote Investment (For Runner 7) | 4,000 |
| Estimated Tote Dividend 74,400/4,000 = 18.60 | |

TABLE VI

Runner 7 Maximum Bet Available Calculation

| | $ |
|---|---|
| Updated Total Pool | 102,900 |
| Less FOB Liability (For Runner 7) | 28,500 |
| Maximum Payout | 74,400 |
| 50% of Maximum Payout | 37,200 |
| Divide by FOB Dividend 18.60 = 37,200/18.60 = 2,000 | |
| Maximum Bet Able to be Accepted = $2,000 | |

TABLE VII

| Runner | TAB | | ATL | | TAB | | ATL | | TAB | | ATL | |
|---|---|---|---|---|---|---|---|---|---|---|---|---|
| No. | TOTE | FO | TOTE | FO | TOTE | FO | TOTE | FO | TOTE | FO | TOTE | FO |
| | POOL = $54,228.0 TIME = 9 MINS. | | | | POOL = $58,207.0 TIME = 8 MINS. | | | | POOL = $62,400.0 TIME = 7 MINS. | | | |
| 1 | 3.2 | 3.2 | 3.2 | 3.1 | 3.3 | 3.3 | 3.2 | 3.0 | 3.3 | 3.3 | 3.1 | 3.0 |
| 2 | 4.4 | 4.4 | 4.4 | 4.0 | 4.1 | 4.2 | 3.5 | 3.9 | 3.8 | 3.8 | 2.7 | 3.7 |
| 3 | 18.4 | 18.4 | 18.4 | 13.1 | 18.8 | 18.4 | 17.8 | 12.9 | 19.1 | 19.0 | 18.5 | 12.8 |
| 4 | 5.1 | 5.1 | 5.1 | 4.7 | 5.3 | 5.3 | 5.2 | 4.7 | 5.5 | 5.5 | 5.4 | 4.8 |
| 5 | 11.4 | 11.4 | 11.4 | 9.2 | 11.9 | 11.8 | 11.5 | 9.2 | 12.3 | 12.2 | 12.2 | 9.3 |
| 6 | 24.0 | 24.0 | 24.0 | 15.7 | 24.3 | 24.0 | 24.6 | 15.3 | 24.6 | 24.8 | 25.2 | 15.2 |
| 7 | 14.4 | 14.4 | 14.4 | 11.0 | 14.5 | 14.4 | 13.9 | 10.7 | 14.9 | 14.9 | 14.6 | 10.7 |
| 8 | 9.6 | 9.6 | 9.6 | 8.0 | 9.4 | 9.6 | 8.2 | 7.7 | 9.5 | 9.3 | 7.9 | 7.7 |
| 9 | 16.0 | 16.0 | 16.0 | 11.9 | 15.4 | 15.4 | 12.5 | 11.2 | 15.8 | 15.4 | 12.8 | 11.2 |
| 10 | 80.7 | 80.7 | 80.7 | 28.5 | 96.5 | 85.7 | 90.0 | 28.7 | 86.6 | 85.5 | 83.4 | 27.7 |
| 11 | 82.9 | 82.8 | 82.9 | 28.8 | 85.6 | 85.3 | 88.4 | 28.6 | 86.5 | 84.2 | 88.1 | 28.1 |
| | POOL = $66,917.0 TIME = 6 MINS | | | | POOL = $72,201.0 TIME = 5 MINS. | | | | POOL = $78,522.0 TIME = 4 MINS. | | | |
| 1 | 3.3 | 3.3 | 2.9 | 3.0 | 3.3 | 3.3 | 2.7 | 3.0 | 3.5 | 3.4 | 2.9 | 3.1 |
| 2 | 3.7 | 3.6 | 2.4 | 3.6 | 3.7 | 3.6 | 2.3 | 3.5 | 3.3 | 3.3 | 1.7 | 3.3 |
| 3 | 18.4 | 18.4 | 17.0 | 12.2 | 18.1 | 18.4 | 16.4 | 11.7 | 17.7 | 17.7 | 15.2 | 11.2 |
| 4 | 5.6 | 5.7 | 5.2 | 4.8 | 5.5 | 5.5 | 4.8 | 4.7 | 5.6 | 5.7 | 4.7 | 4.6 |
| 5 | 13.2 | 13.0 | 13.3 | 9.5 | 13.4 | 13.4 | 13.6 | 9.4 | 13.6 | 13.4 | 13.2 | 9.3 |
| 6 | 24.3 | 24.4 | 22.5 | 14.6 | 25.2 | 25.2 | 22.7 | 14.6 | 24.1 | 23.9 | 18.7 | 13.6 |
| 7 | 15.2 | 14.9 | 14.4 | 10.6 | 15.5 | 15.4 | 14.5 | 10.5 | 16.1 | 15.9 | 14.6 | 10.5 |
| 8 | 9.5 | 9.3 | 8.1 | 7.5 | 9.6 | 9.6 | 8.3 | 7.4 | 9.9 | 9.9 | 8.3 | 7.4 |
| 9 | 16.4 | 16.4 | 13.5 | 11.2 | 16.3 | 16.3 | 12.3 | 11.0 | 17.0 | 16.8 | 13.1 | 10.9 |
| 10 | 88.0 | 87.7 | 87.6 | 27.5 | 86.4 | 87.7 | 83.5 | 26.6 | 81.3 | 81.4 | 73.9 | 24.8 |
| 11 | 90.0 | 89.5 | 94.3 | 28.2 | 90.1 | 88.6 | 94.4 | 27.7 | 94.4 | 94.2 | 99.6 | 27.5 |
| | POOL = $84,711.5 TIME = 3 MINS. | | | | POOL = $96,902.5 TIME = 2 MINS. | | | | POOL = $112,932.5 TIME = 1 MIN. | | | |
| 1 | 3.5 | 3.6 | 2.7 | 3.1 | 3.4 | 3.4 | 2.4 | 2.9 | 3.7 | 3.6 | 2.7 | 3.0 |
| 2 | 3.3 | 3.3 | 1.6 | 3.2 | 3.3 | 3.3 | 1.6 | 3.1 | 3.2 | 3.2 | 1.4 | 3.0 |
| 3 | 17.3 | 17.0 | 14.1 | 10.8 | 17.9 | 18.2 | 14.0 | 10.6 | 17.5 | 17.6 | 12.7 | 10.2 |

TABLE VII-continued

| Runner | TAB | | ATL | | TAB | | ATL | | TAB | | ATL | |
|---|---|---|---|---|---|---|---|---|---|---|---|---|
| No. | TOTE | FO | TOTE | FO | TOTE | FO | TOTE | FO | TOTE | FO | TOTE | FO |
| 4 | 5.7 | 5.7 | 4.6 | 4.7 | 5.8 | 5.9 | 4.7 | 4.6 | 5.4 | 5.5 | 3.8 | 4.3 |
| 5 | 13.5 | 13.3 | 12.7 | 9.1 | 13.9 | 13.7 | 12.0 | 9.0 | 13.8 | 13.7 | 11.0 | 8.7 |
| 6 | 23.8 | 23.9 | 18.1 | 13.1 | 21.9 | 21.3 | 14.7 | 11.9 | 22.8 | 22.7 | 15.3 | 11.9 |
| 7 | 16.2 | 15.9 | 14.0 | 10.3 | 17.3 | 16.9 | 14.9 | 10.4 | 19.0 | 18.7 | 16.5 | 10.8 |
| 8 | 9.9 | 9.9 | 8.3 | 7.2 | 9.4 | 9.3 | 6.7 | 6.9 | 9.6 | 9.6 | 6.5 | 6.8 |
| 9 | 16.9 | 16.8 | 13.2 | 10.6 | 17.4 | 17.4 | 13.2 | 10.4 | 17.2 | 16.7 | 12.1 | 10.1 |
| 10 | 78.3 | 78.3 | 65.3 | 23.2 | 88.6 | 88.3 | 74.0 | 23.7 | 72.6 | 72.5 | 68.2 | 21.7 |
| 11 | 96.6 | 97.1 | 98.1 | 26.9 | 103.8 | 101.9 | 100.5 | 26.4 | 115.5 | 114,9 | 109.4 | 26.6 |
| | POOL = $135,769.0 TIME = ARST | | | | POOL = $147,436.5 TIME = CLOSE | | | | | | | |
| 1 | 3.4 | 3.4 | 2.6 | 2.9 | 3.5 | 3.4 | 2.7 | 3.0 | | | | |
| 2 | 3.4 | 3.4 | 2.0 | 3.1 | 3.2 | 3.2 | 2.0 | 3.0 | | | | |
| 3 | 16.0 | 15.8 | 13.2 | 10.2 | 16.0 | 15.8 | 13.3 | 10.3 | | | | |
| 4 | 5.1 | 5.0 | 3.6 | 4.3 | 5.2 | 5.2 | 3.8 | 4.5 | | | | |
| 5 | 15.7 | 15.6 | 13.1 | 10.1 | 15.9 | 15.6 | 13.4 | 10.3 | | | | |
| 6 | 23.2 | 23.0 | 15.9 | 12.9 | 22.8 | 23.0 | 16.1 | 13.0 | | | | |
| 7 | 21.5 | 21.2 | 18.5 | 12.5 | 22.3 | 21.9 | 19.1 | 12.9 | | | | |
| 8 | 9.3 | 9.4 | 7.6 | 6.8 | 9.2 | 9.4 | 7.6 | 6.8 | | | | |
| 9 | 19.5 | 19.1 | 12.9 | 11.7 | 20.6 | 20.3 | 13.6 | 12.3 | | | | |
| 10 | 69.2 | 69.1 | 62.7 | 22.5 | 73.9 | 73.4 | 65.7 | 23.3 | | | | |
| 11 | 131.6 | 130.2 | 129.3 | 29.5 | 137.4 | 134.2 | 133.8 | 30.0 | | | | |

We claim:

1. A combined win totalizator and fixed odds betting system for punting on the outcome of a race between a multiplicity of runners, said system comprising a plurality of betting terminals each linked to a central processor means and each able to input either a tote wager or a fixed odds bet, wherein:

1. said central processor means is arranged from initial commencement of punting to disable said terminals in respect of fixed odds betting to thereby enable only totalizator wagering,
2. said central processor means is arranged after attainment of a first predetermined target, to deduct from the then total pool of funds wagered, a predetermined commission to arrive at a then net distribution totalizator pool,
3. said central processor means is arranged for each runner in the race to divide the net totalizator distribution pool by the amount in the net distribution totalizator pool wagered on that runner winning in order to arrive at a then projected totalizator dividend for each runner,
4. the dividend for each runner calculated in step 3 above is used by said central processor means to constitute an initial fixed odds betting dividend for each runner,
5. said terminals are enabled by said central processor means to accept fixed odds betting simultaneously with said totalizator wagering whilst maintaining two separate wager and bet dividend liability pools
6. said central processor is arranged, after a further calculatable target has been reached, to, if necessary, recalculate the fixed odds betting dividend by
   (a) from the total of the wager and bet pools deducting said predetermined commission to arrive at a total nett pool
   (b) for each runner deducting from the total nett pool the liability due to the total number of fixed odds bets received to date for that runner to arrive at a nett totalizator pool for that runner,
   (c) from the nett totalizator pool for each runner calculating a revised estimated totalizator dividend, and
   (d) adjusting the fixed odds betting dividend offered thereafter for each runner to be substantially equal to said revised estimated totalizator dividend for that runner,
7. said central processor means repeats step 6, if necessary, following each attainment of further calculatable targets, and
8. said terminals are disabled by said central processor unit in respect of fixed odds betting prior to the disablement of said terminals in respect of totalizator wagering.

2. A system as claimed in claim 1 wherein said central processor means is arranged to have said first calculatable target selected from the group of calculatable targets consisting of a predetermined percentage of an estimated final pool, a predetermined volume of money and a predetermined time from the commencement of the operation of the system.

3. A system as claimed in claim 2 wherein said central process or means is arranged to have said further calculatable target selected from the group of calculatable targets consisting of a further predetermined percentage of said estimated final pool, a further predetermined volume of money, a further predetermined period of time since the first predetermined target has been reached, a predetermined fixed odds betting liability, a predetermined value of fixed odd bets, a predetermined number of fixed odd bets, and a predetermined difference between the projected totalizator dividend for any runner and the calculated fixed odds dividend for that runner.

4. A system as claimed in claim 3 wherein said central processor means re-calculates the fixed odds betting dividend for each runner by rounding down to below the revised estimated totalizator dividend for that runner.

5. The system as claimed in claim 4 wherein said central processor means rounds down to an integral multiple of a predetermined decimal number.

6. The system as claimed in claim 5 wherein said predetermined decimal number is constant irrespective of the value of said fixed odds betting dividend.

7. The system as claimed in claim 5 wherein said predetermined decimal number varies in response to the value of said fixed odds betting dividend.

8. The system as claimed in claim 1 wherein said central processor means is arranged to limit the amount of money accepted for a fixed odds bet to a predetermined maximum value.

9. The system as claimed in claim 8 wherein said central processor means calculates for each said runner the maximum fixed odds bet to be a predetermined portion of the difference between the total available pool to date less the current fixed odds betting liability to date for the runner, dividend by the current fixed odds betting dividend for that runner.

10. The system as claimed in claim 9 wherein said predetermined portion is 50%.

11. The system as claimed in claim 9 wherein said central processor means re-calculates said maximum fixed odds bet on each occasion on which said fixed odds betting dividend is re-calculated.

12. The system as claimed in claim 1 wherein said central processor means disables said terminals as regards fixed odds betting a predetermined time period prior to the expected start time for the race.

13. A method as claimed in claim 1 including the further step of:

10. limiting the amount of money accepted for a fixed odds bet to a predetermined maximum value.

14. A method as claimed in claim 13 wherein for each runner the maximum fixed odds bet is calculated to be a predetermined portion of the difference between the total available pool to date less the current fixed odds betting liability to date for the runner, divided by the current fixed odds betting dividend for that runner.

15. A method as claimed in claim 14 wherein said predetermined portion is 50%.

16. A method as claimed in claim 14 including the further step of:

11. carrying out step 10 on each occasion on which step 6 is carried out.

17. A method as claimed in claim 1 wherein step 8 is carried out at a predetermined time period prior to the expected start time for the race.

18. A method of operating a combined win totalizator and fixed odds betting system for punting on the outcome of a race between a multiplicity of runners, said system comprising the steps of:

1. from initial commencement of punting accepting only totalizator wagering,
2. after attainment of a first predetermined target, deducting from the then total pool of funds wagered a predetermined commission to arrive at a then net distribution totalizator pool,
3. for each runner in the race dividing the net totalizator distribution pool by the amount in the net distribution totalizator pool wagered on that runner winning in order to arrive at a then projected totalizator dividend for each runner,
4. using the dividend for each runner calculated in step 3 above to constitute an initial fixed odds betting dividend for each runner,
5. accepting fixed odds betting simultaneously with said totalizator wagering and maintaining two separate wager and bet dividend liability pools
6. after a further calculatable target has been reached, if necessary recalculating the fixed odds betting dividend by .
   (a) from the total of the wager and bet pools deducting said predetermined commission to arrive at a total nett pool
   (b) for each runner deducting from the total nett pool the liability due to the total number of fixed odds bets received to date for that runner to arrive at a nett totalizator pool for that runner,
   (c) from the nett totalizator pool for each runner calculating a revised estimated totalizator dividend, and
   (d) adjusting the fixed odds betting dividend offered thereafter for each runner to be said revised estimated totalizator dividend for that runner,
7. repeating step 6, if necessary, following each attainment of further calculatable targets, and
8. ceasing fixed odds betting prior to ceasing totalizator wagering.

19. A method as claimed in claim 18 wherein said first calculatable target is selected from the group of calculatable targets consisting of a predetermined percentage of an estimated final pool, a predetermined volume of money and a predetermined time from the commencement of the operation of the system.

20. A method as claimed in claim 19 wherein said further calculatable target is selected from the group of calculatable targets consisting of calculatable targets consisting of a further predetermined percentage of said estimated final pool, a further predetermined volume of money, a further predetermined period of time since the first predetermined target has been reached, a predetermined fixed odds betting liability, a predetermined value of fixed odd bets, a predetermined number of fixed odd bets, and a predetermined difference between the projected totalizator dividend for any runner and the calculated fixed odds dividend for that runner.

21. A method as claimed in claim 20 including the further step of:

9. re-calculating the fixed odds betting dividend for each runner by rounding down to below the revised estimated totalizator dividend for that runner.

22. A method as claimed in claim 21 wherein said rounding down is to an integral multiple of a predetermined decimal number.

23. A method as claimed in claim 22 wherein said predetermined decimal number is varied in response to the value of said fixed odds betting dividend.

* * * * *

UNITED STATES PATENT AND TRADEMARK OFFICE

CERTIFICATE OF CORRECTION

PATENT NO. : 5,672,106
DATED : September 30, 1997
INVENTOR(S) : John Flindt Orford et al.

It is certified that error appears in the above-identified patent and that said Letters Patent is hereby corrected as shown below:

Column 3,
Line 53, after "pools" insert -- , -- (comma)
Line 58, after "pool" insert -- , -- (comma)

Column 5,
Line 2, after "of" delete "$100,00" and insert therefor -- $100,000 --

Column 6,
Line 19, after "eight" delete "as"
Line 26, after "an" delete "so"
Line 33, after "of" delete "as"

Column 7,
Line 21, before "money" delete "as"
Line 31, after "this" delete "mount" and insert therefor -- amount --
Line 56, after "procedures" delete "am" and insert therefor -- are --

Column 8,
Line 41, after "totalizator" delete "waters" and insert therefor -- wagers --

Column 9,
Line 32, after "prior" delete "an" and insert therefor -- art --

Column 12,
Table VII, under "POOL = $58,207.0 TIME = 8 MINS." for "Runner No. 10", delete "96.5" and insert therefor -- 86.5 --

Column 13,
Table VII - continued, under "POOL = $96,902.5 TIME = 2 MINS." for "Runner No. 6", delete "21.9" and insert therefor -- 21.8 --

Column 14,
Table VII - continued, under "POOL = $112,932.5 TIME = 1 MIN." for "Runner No. 11", delete "114,9" and insert therefor -- 114.9 --

UNITED STATES PATENT AND TRADEMARK OFFICE

CERTIFICATE OF CORRECTION

PATENT NO. : 5,672,106
DATED : September 30, 1997
INVENTOR(S) : John Flindt Orford et al.

It is certified that error appears in the above-identified patent and that said Letters Patent is hereby corrected as shown below:

Column 15,
Line 10, before "by", delete "dividend" and insert therefor -- divided --

Signed and Sealed this

Fourteenth Day of May, 2002

Attest:

JAMES E. ROGAN
*Director of the United States Patent and Trademark Office*

*Attesting Officer*